United States Patent
Jung et al.

(10) Patent No.: US 10,017,029 B2
(45) Date of Patent: Jul. 10, 2018

(54) AIR CONDITIONING SYSTEM FOR MOTOR VEHICLES

(71) Applicant: HANON SYSTEMS, Daejeon (KR)

(72) Inventors: Jae Hwan Jung, Daejeon (KR); Tae Yun Kong, Daejeon (KR); In Hyeok Kim, Daejeon (KR); Tae Wan Kim, Daejeon (KR); Jeong Hun Seo, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 56 days.

(21) Appl. No.: 15/064,715

(22) Filed: Mar. 9, 2016

(65) Prior Publication Data
US 2016/0263965 A1 Sep. 15, 2016

(30) Foreign Application Priority Data

Mar. 9, 2015 (KR) .................. 10-2015-0032561
Feb. 26, 2016 (KR) .................. 10-2016-0023228

(51) Int. Cl.
*B60H 1/00* (2006.01)

(52) U.S. Cl.
CPC ..... *B60H 1/00471* (2013.01); *B60H 1/00064* (2013.01); *B60H 2001/002* (2013.01); *B60H 2001/00192* (2013.01)

(58) Field of Classification Search
CPC ............ B60H 1/00471; B60H 1/00064; B60H 2001/00192; B60H 2001/002
USPC ......................................................... 165/202
See application file for complete search history.

(56) References Cited

U.S. PATENT DOCUMENTS

| 4,762,169 A * | 8/1988 | Andersen ............... B60K 37/06 165/203 |
| 5,816,064 A * | 10/1998 | Moore ............... B60H 1/00035 62/244 |
| 5,860,593 A * | 1/1999 | Heinle ................. B60H 1/0075 165/204 |
| 6,152,217 A * | 11/2000 | Ito ...................... B60H 1/00064 165/202 |
| 6,915,650 B2 * | 7/2005 | Ito ...................... B60H 1/00064 165/217 |
| 7,159,651 B2 * | 1/2007 | Ito ...................... B60H 1/00007 165/202 |
| 7,228,895 B2 * | 6/2007 | Natsume ............ B60H 1/00064 165/204 |
| 7,540,322 B2 * | 6/2009 | Kang ................. B60H 1/00064 165/202 |
| 9,102,215 B2 * | 8/2015 | Kumar ............... B60H 1/00742 |
| 2002/0000314 A1 * | 1/2002 | Danieau ............. B60H 1/00021 165/203 |
| 2002/0017383 A1 * | 2/2002 | Vincent ............. B60H 1/00064 165/204 |
| 2004/0093885 A1 * | 5/2004 | Ito ...................... B60H 1/00028 62/244 |
| 2004/0107713 A1 * | 6/2004 | Aoki .................. B60H 1/00064 62/208 |

(Continued)

Primary Examiner — Raheena R Malik
(74) Attorney, Agent, or Firm — Shumaker, Loop & Kendrick, LLP; James D. Miller

(57) ABSTRACT

An air conditioning system for motor vehicles includes an air conditioner case, a blower installed in the air conditioner case and configured to draw an air and blow the air into a vehicle room, and a control unit configured to limit an upper limit value of a temperature of the air blown toward the blower.

8 Claims, 7 Drawing Sheets

(56) References Cited

U.S. PATENT DOCUMENTS

| | | | |
|---|---|---|---|
| 2005/0205247 A1* | 9/2005 | Ezaki | B60H 1/00028 165/204 |
| 2006/0000592 A1* | 1/2006 | Bosquet | B60H 1/00021 165/202 |
| 2006/0000595 A1* | 1/2006 | Kang | B60H 1/00064 165/203 |
| 2009/0038774 A1* | 2/2009 | Ogiso | B60H 1/247 165/42 |
| 2011/0005707 A1* | 1/2011 | Seto | B60H 1/00064 165/41 |
| 2012/0295529 A1* | 11/2012 | Fukutomi | B60H 1/0005 454/152 |

* cited by examiner

AIR CONDITIONING SYSTEM FOR MOTOR VEHICLES

CROSS-REFERENCE TO RELATED APPLICATIONS

This application claims priority to Korean Patent Application No. 10-2015-0032561 filed on Mar. 9, 2015 and Korean Patent Application No. 10-2016-0023228 filed Feb. 26, 2016, hereby incorporated herein by reference in their entirety.

FIELD OF THE INVENTION

The present invention relates to a three-zone-type air conditioning system for motor vehicles which is configured to independently cool and heat a driver seat zone, a front passenger seat zone and a rear seat zone of a vehicle room and, more particularly, to an air conditioning system for motor vehicles which is capable of limiting an upper limit value of a temperature of an air introduced into an auxiliary blower and consequently preventing thermal deformation or damage of the auxiliary blower attributable to the contact of the auxiliary blower with a hot air and the resultant overheating thereof.

BACKGROUND ART

In recent years, there has been developed an air conditioning system which is configured to independently cool and heat a plurality of zones with a vehicle room. For example, there has been developed and used a three-zone-type air conditioning system which is configured to independently cool and heat a driver seat zone, a front passenger seat zone and a rear seat zone of a vehicle room.

In the three-zone-type air conditioning system, as illustrated in FIGS. 1 and 2, a driver seat path 12, a front passenger seat path 14 and a rear seat path 16 are formed within an air conditioner case 10. Temperature doors 20, 22 and 24 are installed in the driver seat path 12, the front passenger seat path 14 and the rear seat path 16, respectively. The temperatures of an air supplied to a driver seat zone, a front passenger seat zone and a rear seat zone are independently controlled by independently controlling the temperature doors 20, 22 and 24. This makes it possible to independently cool and heat the driver seat zone, the front passenger seat zone and the rear seat zone.

As illustrated in FIG. 2, the rear seat temperature door 24 typically includes a first rear seat temperature door 24a installed in the rear seat path 16 at the downstream side of an evaporator 30 and a second rear seat temperature door 24b installed in the rear seat path 16 at the downstream side of a heater core 32.

The first and second rear seat temperature doors 24a and 24b are operated in cooperation with each other to control the temperature of the air blown toward the rear seat path 16, thereby adjusting the temperature of the air supplied to the rear seat zone.

The three-zone-type air conditioning system further includes an auxiliary blower 40 installed in the rear seat path 16. Unlike a main blower 11 for drawing an air existing outside the air conditioner case 10, the auxiliary blower 40 is configured to draw an air existing within the air conditioner case 10. The auxiliary blower 40 further increases the volume and pressure of the air blown along the rear seat path 16 after passing through the evaporator 30 and the heater core 32, thereby increasing the volume and pressure of the air blown toward the rear seat zone. This makes it possible to enhance the cooling and heating performance of the rear seat zone.

In the air conditioning system of the related art, if the air introduced into the rear seat path 16 has a high temperature, namely if the hot air passed through the heater core 32 is introduced into the rear seat path 16, the auxiliary blower 40 is continuously exposed to the hot air. Due to the continuous exposure of the auxiliary blower 40 to the hot air, the auxiliary blower 40 may be thermally deformed or damaged. This may lead to a problem in that the blowing performance of the auxiliary blower 40 is reduced and a blowing noise is generated.

In particular, when the rotation speed of the auxiliary blower 40 is high, the auxiliary blower 40 may be overheated. If the overheating of the auxiliary blower 40 and the contact of the auxiliary blower 40 with the hot air occur at the same time, the auxiliary blower 40 may undergo severe thermal deformation and damage.

For example, when the rear seat zone is controlled in a vent mode and a bi-level mode, the auxiliary blower 40 is rotated faster than in a floor mode. In this case, the auxiliary blower 40 may be overheated. When making contact with the hot air, the overheated auxiliary blower 40 may undergo severe thermal deformation and damage.

This may lead to a problem in that the blowing performance of the auxiliary blower 40 is reduced and a blowing noise is generated. Thus, the pleasantness in the rear seat zone may be sharply reduced.

SUMMARY OF THE INVENTION

In view of the above-noted problems, it is an object of the present invention to provide an air conditioning system for motor vehicles which is configured to actively control the temperature of an air introduced into an auxiliary blower depending on the rotation speed of the auxiliary blower and which is capable of actively reducing the temperature of an air introduced into the auxiliary blower when the auxiliary blower is overheated due to high speed rotation.

Another object of the present invention is to provide an air conditioning system for motor vehicles which is configured to actively reduce the temperature of an air introduced into an auxiliary blower when the auxiliary blower is overheated due to high speed rotation and which is capable of preventing the overheating of the auxiliary blower and preventing the resultant thermal deformation and damage of the auxiliary blower.

A further object of the present invention is to provide an air conditioning system for motor vehicles which is configured to actively reduce the temperature of an air introduced into an auxiliary blower when the auxiliary blower is overheated due to high speed rotation and which is capable of preventing a hot air from making contact with the overheated auxiliary blower.

A still further object of the present invention is to provide an air conditioning system for motor vehicles which is configured to prevent a hot air from making contact with an overheated auxiliary blower and which is capable of preventing thermal deformation and damage of the auxiliary blower attributable to the contact of the auxiliary blower with a hot air.

A yet still further object of the present invention is to provide an air conditioning system for motor vehicles which is configured to prevent thermal deformation and damage of an auxiliary blower and which is capable of preventing reduction of the blowing performance of the auxiliary blower and generation of a blowing noise attributable to the thermal deformation and damage of the auxiliary blower and consequently enhancing the pleasantness in a rear seat zone.

In order to achieve the above objects, there is provided an air conditioning system for motor vehicles, including: an air conditioner case; a blower installed in the air conditioner case and configured to draw an air and blow the air into a vehicle room; and a control unit configured to limit an upper limit value of a temperature of the air blown toward the blower.

In the air conditioning system, the blower may include a main blower configured to draw an air existing outside the air conditioner case and an auxiliary blower configured to draw an air existing within the air conditioner case, and the control unit may be configured to limit an upper limit value of a temperature of an air introduced into the auxiliary blower.

The air conditioning system may further include: a rear seat path through which the air drawn by the main blower flows toward the auxiliary blower via an evaporator or a heater core; and a rear seat temperature door installed at an upstream side of the auxiliary blower so as to control an opening amount of the rear seat path, wherein the control unit may be configured to limit the upper limit value of the temperature of the air introduced into the auxiliary blower by controlling an opening position of the rear seat temperature door with respect to the rear seat path.

In the air conditioning system, the control unit may be configured to differentially control the opening position of the rear seat temperature door with respect to the rear seat path depending on a rotation speed of the auxiliary blower.

In the air conditioning system, the control unit may be configured to control the opening position of the rear seat temperature door with respect to the rear seat path depending on a rear seat zone air injection mode.

In the air conditioning system, the control unit may be configured to control the opening position of the rear seat temperature door so that when the rear seat zone air injection mode is a vent mode or a bi-level mode, the temperature of the air introduced into the auxiliary blower is maintained at a temperature lower than a predetermined first reference temperature and so that when the rear seat zone air injection mode is a floor mode, the temperature of the air introduced into the auxiliary blower is maintained at a temperature lower than a second reference temperature which is higher than the first reference temperature.

In the air conditioning system, the first reference temperature may be 70 degrees C. and the second reference temperature may be 75 degrees C.

In the air conditioning system, the control unit may be configured to differentially control a rotation speed of the auxiliary blower depending on a rear seat zone air injection mode.

In the air conditioning system, the control unit may be configured to control the rotation speed of the auxiliary blower so as to become higher when the rear seat zone air injection mode is a vent mode or a bi-level mode than when the rear seat zone air injection mode is a floor mode.

Furthermore, there is provided an air conditioning system for motor vehicles, including: an air conditioner case; a main blower configured to draw an air existing outside the air conditioner case; a rear seat path through which the air drawn by the main blower flows toward a rear seat zone via an evaporator or a heater core; an auxiliary blower installed in the rear seat path to draw an air existing within the air conditioner case and blow the air toward the rear seat zone; and a temperature sensor installed at one of an upstream side and a downstream side of the auxiliary blower to detect a temperature of an air existing near the auxiliary blower.

The air conditioning system may further include: a rear seat temperature door installed at the upstream side of the auxiliary blower so as to control an opening amount of the rear seat path; and a control unit configured to differentially control an opening position of the rear seat temperature door with respect to the rear seat path depending on the temperature of the air existing near the auxiliary blower, which is inputted from the temperature sensor.

In the air conditioning system, when the temperature of the air existing near the auxiliary blower is equal to or higher than a predetermined first reference temperature, the control unit is configured to control the rear seat temperature door so as to close the rear seat path at a predetermined opening degree so that a temperature of an air introduced into the auxiliary blower is maintained at a temperature lower than the first reference temperature.

According to the present invention, the air conditioning system for motor vehicles is configured to actively control the temperature of an air introduced into an auxiliary blower depending on the rotation speed of the auxiliary blower. It is therefore possible to actively reduce the temperature of an air introduced into the auxiliary blower when the auxiliary blower is overheated due to high speed rotation.

Since the air conditioning system is configured to actively reduce the temperature of an air introduced into an auxiliary blower when the auxiliary blower is overheated due to high speed rotation, it is possible to prevent the overheating of the auxiliary blower and to prevent the resultant thermal deformation and damage of the auxiliary blower.

Since the air conditioning system is configured to actively reduce the temperature of an air introduced into an auxiliary blower when the auxiliary blower is overheated due to high speed rotation, it is possible to prevent a hot air from making contact with the overheated auxiliary blower.

Since the air conditioning system is configured to prevent a hot air from making contact with an overheated auxiliary blower, it is possible to prevent thermal deformation and damage of the auxiliary blower attributable to the contact of the auxiliary blower with a hot air.

Since the air conditioning system is configured to prevent thermal deformation and damage of an auxiliary blower, it is possible to prevent reduction of the blowing performance of the auxiliary blower and generation of a blowing noise attributable to the thermal deformation and damage of the auxiliary blower and, consequently, to enhance the pleasantness in a rear seat zone.

Since the air conditioning system is configured to actively control the temperature of an air introduced into an auxiliary blower depending on the rotation speed of the auxiliary blower, it is possible to actively cope with the increase in the temperature of the air introduced into the auxiliary blower.

Since the air conditioning system is configured to actively cope with the increase in the temperature of the air introduced into the auxiliary blower, it is possible to reliably prevent a hot air from flowing into the auxiliary blower and, consequently, to reliably prevent the overheating of the auxiliary blower attributable to the introduction of a hot air.

BRIEF DESCRIPTION OF THE DRAWINGS

The above and other objects and features of the present invention will become apparent from the following description of preferred embodiments given in conjunction with the accompanying drawings.

DETAILED DESCRIPTION OF THE PREFERRED EMBODIMENTS

Figure 1:
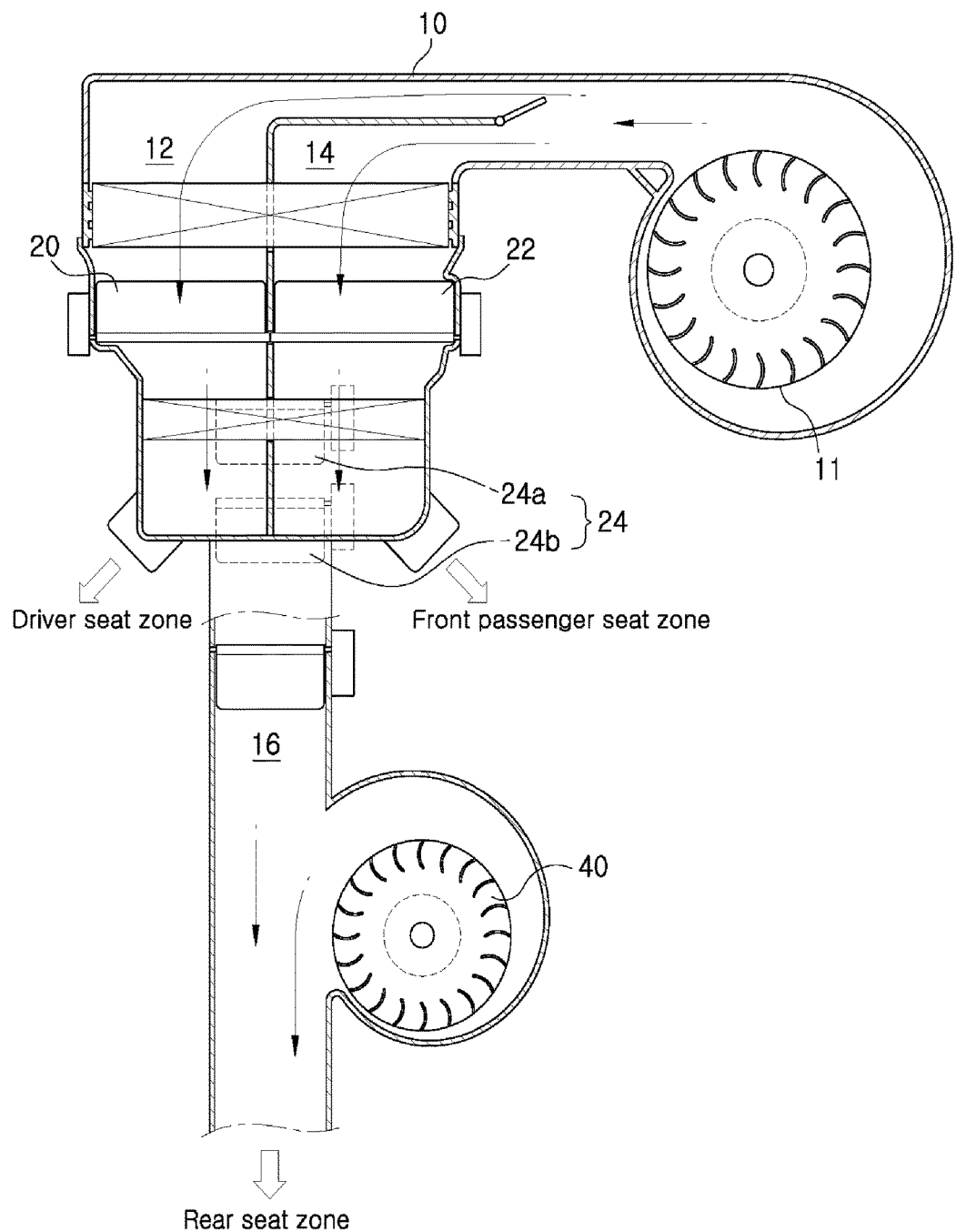
FIG. 1 is a view showing an air conditioning system for motor vehicles of the prior art.
Figure 2:
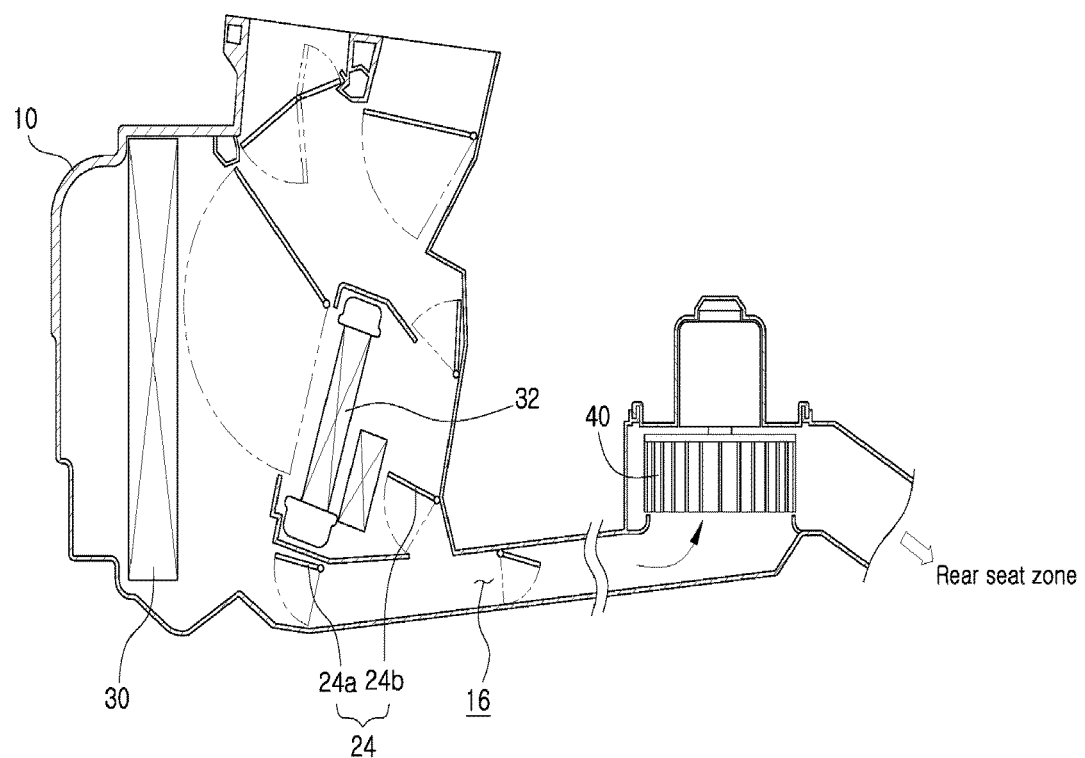
FIG. 2 is a sectional view of the air conditioning system of the prior art shown in FIG. 1.

Preferred embodiments of an air conditioning system for motor vehicles according to the present invention will now be described in detail with reference to the accompanying drawings. Components similar to those of the prior art described earlier will be designated by like reference symbols.

Prior to describing features of an air conditioning system for motor vehicles according to the present invention, a three-zone-type air conditioning system will be briefly described with reference to FIGS. 3 and 4.

In a three-zone-type air conditioning system, a driver seat path 12, a front passenger seat zone path 14 and a rear seat path 16 are formed within an air conditioner case 10. Temperature doors 20, 22 and 24 are installed in the driver seat path 12, the front passenger seat zone path 14 and the rear seat path 16, respectively. The temperatures of an air supplied to a driver seat zone, a front passenger seat zone and a rear seat zone are independently controlled by independently controlling the temperature doors 20, 22 and 24. This makes it possible to independently cool and heat the driver seat zone, the front passenger seat zone and the rear seat zone.

Figure 4:
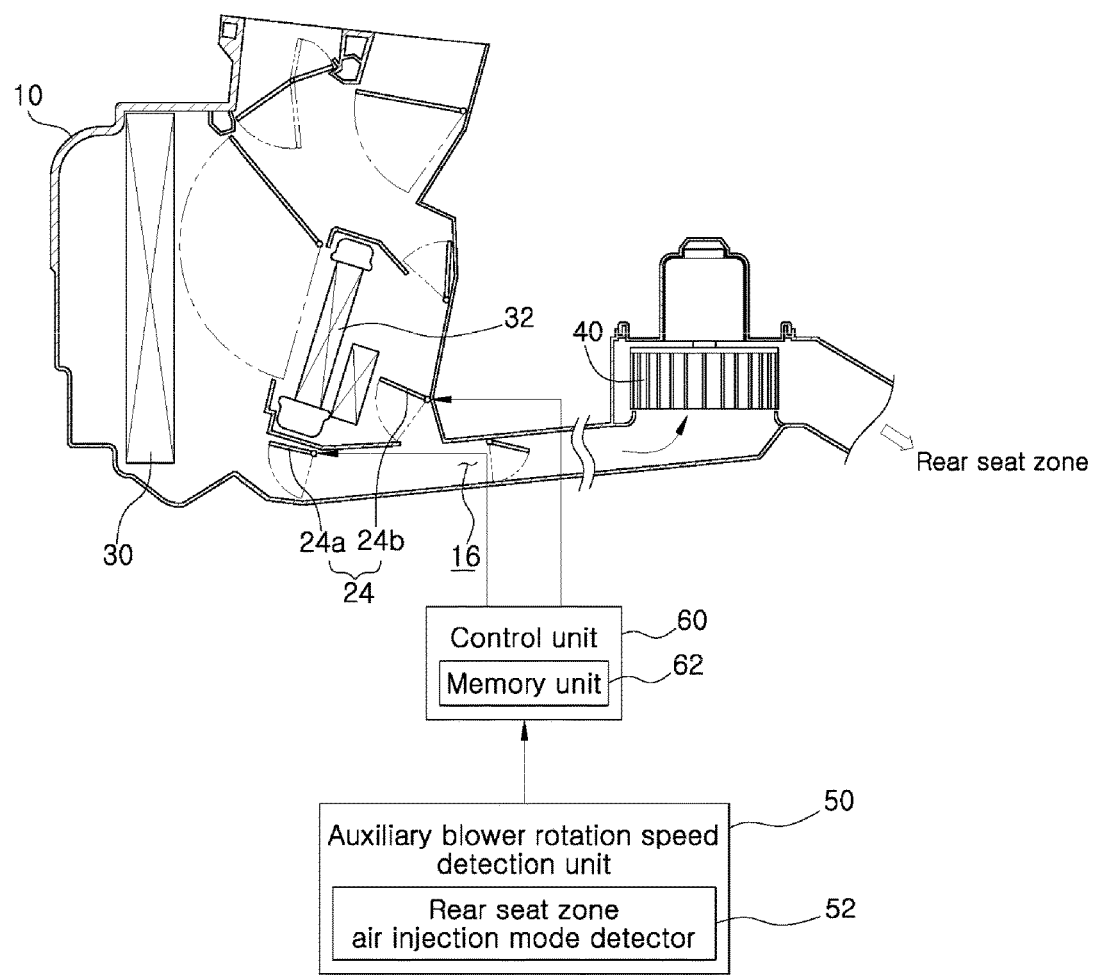
FIG. 4 is a sectional view of the air conditioning system for motor vehicles according to the first embodiment of the present invention illustrated in FIG. 3.

As illustrated in FIG. 4, the rear seat temperature door 24 typically includes a first rear seat temperature door 24a installed in the rear seat path 16 at the downstream side of an evaporator 30 and a second rear seat temperature door 24b installed in the rear seat path 16 at the downstream side of a heater core 32.

The first and second rear seat temperature doors 24a and 24b are operated in cooperation with each other to control the temperature of the air blown toward the rear seat path 16, thereby adjusting the temperature of the air supplied to the rear seat zone.

The three-zone-type air conditioning system further includes an auxiliary blower 40 installed in the rear seat path 16. Unlike a main blower 11 for drawing an air existing outside the air conditioner case 10, the auxiliary blower 40 is configured to draw an air existing within the air conditioner case 10. The auxiliary blower 40 further increases the volume and pressure of the air blown along the rear seat path 16 after passing through the evaporator 30 and the heater core 32, thereby increasing the volume and pressure of the air blown toward the rear seat zone. This makes it possible to enhance the cooling and heating performance of the rear seat zone.

Next, some features of the air conditioning system for motor vehicles according to a first embodiment of the present invention will be described in detail with reference to FIGS. 3 to 5.

Figure 3:
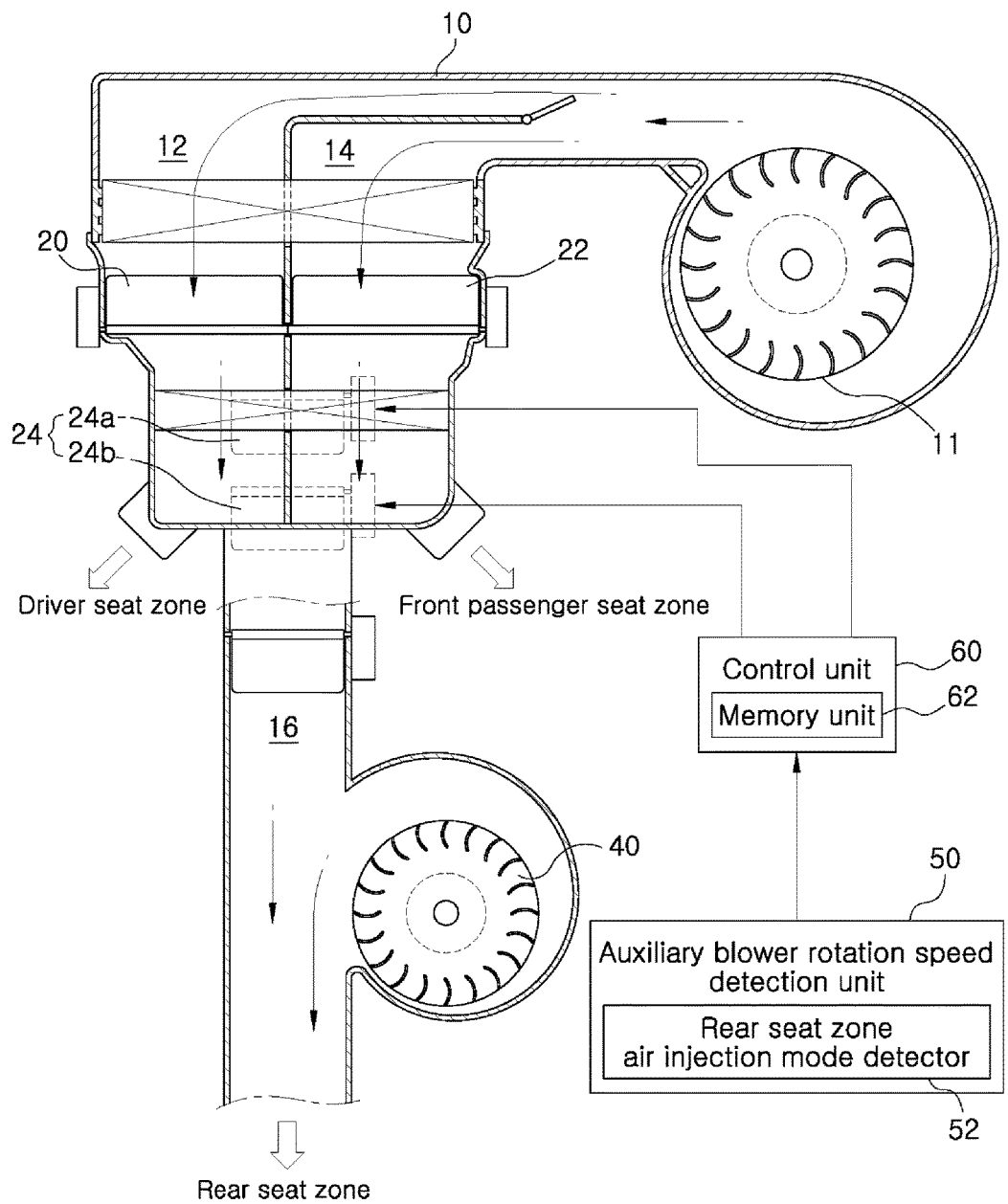
FIG. 3 is a view illustrating an air conditioning system for motor vehicles according to a first embodiment of the present invention.

Referring first to FIGS. 3 and 4, the air conditioning system according to the present embodiment includes an auxiliary blower rotation speed detection unit 50 configured to detect a rotation speed of the auxiliary blower 40.

The auxiliary blower rotation speed detection unit 50 includes a rear seat zone air injection mode detector 52 configured to detect a rear seat zone air injection mode. The rear seat zone air injection mode detector 52 includes an injection mode adjustment switch (not shown) for a rear seat controller (not shown).

The injection mode adjustment switch is a switch for selecting one of a vent mode, a bi-level mode and a floor mode as a rear seat zone air injection mode. Upon selecting the rear seat air injection mode, it is possible for the auxiliary blower rotation speed detection unit 50 to indirectly detect the rotation speed of the auxiliary blower 40 which is changed depending on the air injection mode.

For reference, the rear seat zone air injection mode is controlled in three modes, namely the vent mode, the bi-level mode and the floor mode. When the rear seat zone air injection mode is controlled in the vent mode or the bi-level mode, the rotation speed of the auxiliary blower 40 is controlled to become high. When the rear seat zone air injection mode is controlled in the floor mode, the rotation speed of the auxiliary blower 40 is controlled to become lower than the rotation speed of the auxiliary blower 40 available in the vent mode or the bi-level mode.

Accordingly, the rotation speed of the auxiliary blower 40 can be detected by detecting the rear seat zone air injection mode.

In some embodiments, the rear seat zone air injection mode detector 52 may include an automatic control unit (not shown) for automatically controlling the rear seat zone air injection mode. The automatic control unit finds a rear seat zone cooling/heating load based on vehicle room temperature and a preset rear seat zone temperature, calculates an optimal rear seat zone air injection mode based on the rear seat zone cooling/heating load, and automatically controls the rear seat zone air injection mode based on the calculation result. The rear seat zone air injection mode detector 52 can detect the rear seat zone air injection mode based on a rear seat zone air injection mode control signal generated by the automatic control unit, thereby detecting the rotation speed of the auxiliary blower 40.

The automatic control unit includes a microprocessor and a drive circuit. Since the automatic control unit is well-known in the art, descriptions thereof will be omitted.

In the present embodiment, the rotation speed of the auxiliary blower 40 is detected depending on the rear seat zone air injection mode. However, if necessary, it may be possible to directly detect the rotation speed of the auxiliary blower 40.

Referring again to FIGS. 3 and 4, the air conditioning system according to the present embodiment includes a control unit 60. The control unit 60 includes a microprocessor and a memory unit 62. The memory unit 62 stores different rear seat temperature door opening position values associated with auxiliary blower rotation speeds. In the present embodiment, as described above, the rotation speed of the auxiliary blower 40 is detected depending on the rear seat zone air injection mode. Therefore, instead of the rear seat temperature door opening position values associated with auxiliary blower rotation speeds, the rear seat temperature door opening position values associated with rear seat zone air injection modes may be stored in the memory unit 62.

If data on the rotation speed of the auxiliary blower 40 are inputted from the auxiliary blower rotation speed detection unit 50, namely if a rear seat zone air injection mode is inputted from the rear seat zone air injection mode detector 52 of the auxiliary blower rotation speed detection unit 50, the control unit 60 detects a rear seat temperature door opening position value corresponding to the inputted rear seat zone air injection mode from the memory unit 62.

After the rear seat temperature door opening position value corresponding to the inputted rear seat zone air injection mode is detected, the control unit 60 controls an opening position of the rear seat temperature door 24 based on the detected rear seat temperature door opening position value. Specifically, the control unit 60 actively controls the first and second rear seat temperature doors 24a and 24b based on the detected rear seat temperature door opening position value.

It is therefore possible to actively control the temperature of the air introduced into the auxiliary blower 40 depending on the rear seat zone air injection mode. This makes it possible to actively control the temperature of the air introduced into the auxiliary blower 40 depending on the rotation speed of the auxiliary blower 40.

As a result, when there is a possibility that the auxiliary blower 40 is overheated due to the high-speed rotation thereof, it is possible to limit an upper limit value of the temperature of the air introduced into the auxiliary blower 40. Specifically, it is possible to reduce the temperature of the air introduced into the auxiliary blower 40.

Consequently, it is possible to prevent the overheating of the auxiliary blower 40 and to prevent thermal deformation and damage of the auxiliary blower 40.

Since the temperature of the air introduced into the auxiliary blower 40 can be reduced when the auxiliary blower 40 is overheated due to the high-speed rotation thereof, it is possible to prevent a hot air from making contact with the overheated auxiliary blower 40. It is therefore possible to prevent thermal deformation and damage of the auxiliary blower 40 attributable to the contact of the auxiliary blower 40 with a hot air.

As described above, the memory unit 62 stores the rear seat temperature door opening position values associated with rear seat zone air injection modes. In this regard, it is preferred that the rear seat temperature door opening position value corresponding to the vent mode or the bi-level mode is set at such a value as to enable an air having a low temperature less than a predetermined first reference temperature to be blown toward the rear seat path 16.

Furthermore, it is preferred that the rear seat temperature door opening position value corresponding to the floor mode is set at such a value as to enable an air having a temperature less than a predetermined second reference temperature higher than the first reference temperature to be blown toward the rear seat path 16.

The reason for employing this configuration is to make sure that the air having a temperature lower than the first reference temperature is blown toward the auxiliary blower 40 when the rear seat zone air injection mode is the vent mode or the bi-level mode in which the auxiliary blower 40 is rotated at a high speed and is likely to be overheated. This makes it possible to prevent the overheating of the auxiliary blower 40.

When the rear seat zone air injection mode is the floor mode, the auxiliary blower 40 is rotated at a speed lower than the rotation speed available in the vent mode or the bi-level mode and is less likely to be overheated. Thus, the temperature of the air blown toward the auxiliary blower 40 may be set higher than the second reference temperature.

Preferably, the first reference temperature stored in the memory unit 62 may be 70 degrees C. At the rotation speed of the auxiliary blower 40 available when the rear seat zone is controlled in the vent mode or the bi-level mode, if an air having a temperature of 70 degrees C. or more is introduced into the auxiliary blower 40, it is highly likely that the auxiliary blower 40 undergoes thermal deformation and damage.

For that reason, when the rear seat zone is controlled in the vent mode or the bi-level mode, it is preferable to allow an air having a temperature of less than 70 degrees C. to be introduced into the auxiliary blower 40, thereby preventing thermal deformation and damage of the auxiliary blower 40.

The second reference temperature stored in the memory unit 62 may preferably be 75 degrees C. At the rotation speed of the auxiliary blower 40 available when the rear seat zone is controlled in the floor mode, if an air having a temperature of 75 degrees C. or more is introduced into the auxiliary blower 40, it is highly likely that the auxiliary blower 40 undergoes thermal deformation and damage.

For that reason, when the rear seat zone is controlled in the vent mode or the bi-level mode, it is preferable to allow an air having a temperature of less than 75 degrees C. to be introduced into the auxiliary blower 40, thereby preventing thermal deformation and damage of the auxiliary blower 40.

Next, an operation example of the air conditioning system according to the present embodiment will be described in detail with reference to FIGS. 3 to 5.

Figure 5:
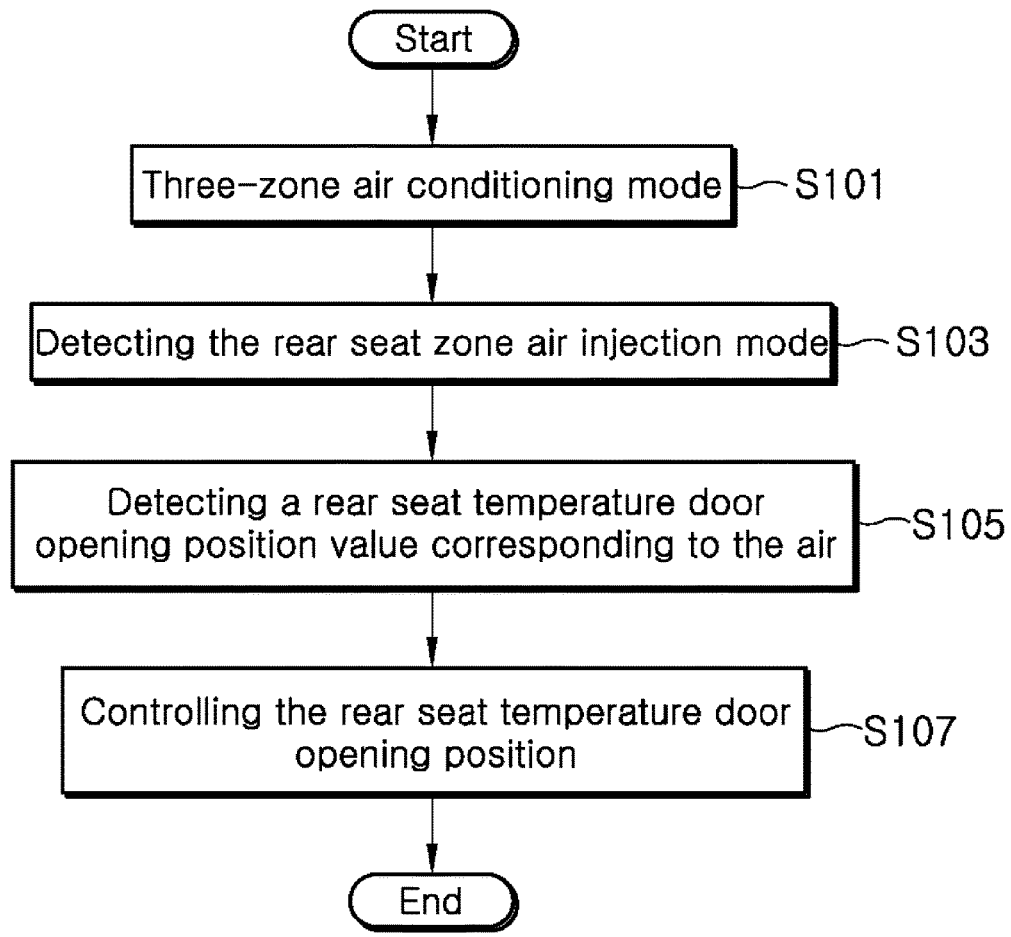
FIG. 5 is a flowchart illustrating an operation example of the air conditioning system for motor vehicles according to the first embodiment of the present invention.

Referring first to FIGS. 4 and 5, when the air conditioning system is in a three-zone air conditioning mode (S101), the rear seat zone air injection mode detector 52 detects a current rear seat zone air injection mode (S103). For example, the rear seat zone air injection mode detector 52 determines whether the rear seat zone is in the vent mode, the bi-level mode or the floor mode.

If the detection of the rear seat zone air injection mode is completed, the control unit 60 detects a rear seat temperature door opening position value configured to the detected air injection mode from the memory unit 62 (S105).

If the detection of the rear seat temperature door opening position value is completed, the control unit 60 controls the opening position of the rear seat temperature door 24 based on the detected rear seat temperature door opening position value (S107).

At this time, if the rear seat zone is controlled in the vent mode or the bi-level mode and if the rear seat temperature door opening position value corresponding to the vent mode or the bi-level mode is detected, the control unit 60 controls the rear seat temperature door 24 so that the temperature of the air blown toward the auxiliary blower 40 is maintained at a temperature of less than 70 degrees C.

If the rear seat zone is controlled in the floor mode and if the rear seat temperature door opening position value corresponding to the floor mode is detected, the control unit 60 controls the rear seat temperature door 24 so that the temperature of the air blown toward the auxiliary blower 40 is maintained at a temperature of less than 75 degrees C.

Then, the temperature of the air introduced into the auxiliary blower 40 is actively controlled according to the rear seat zone air injection mode, namely the rotation speed of the auxiliary blower 40.

Thus, when the auxiliary blower 40 is rotated at a high speed and is likely to be overheated, the temperature of the air blown toward the auxiliary blower 40 is reduced. As a result, it is possible to reliably prevent the overheating of the auxiliary blower 40 and, consequently, to prevent thermal deformation and damage of the auxiliary blower 40. Furthermore, it is possible to prevent a hot air from making contact with the auxiliary blower 40. This makes it possible to prevent thermal deformation and damage of the auxiliary blower 40 attributable to the contact of the auxiliary blower 40 with a hot air.

Next, an air conditioning system for motor vehicles according to a another embodiment of the present invention will be described with reference to FIGS. 6 and 7.

Figure 6:
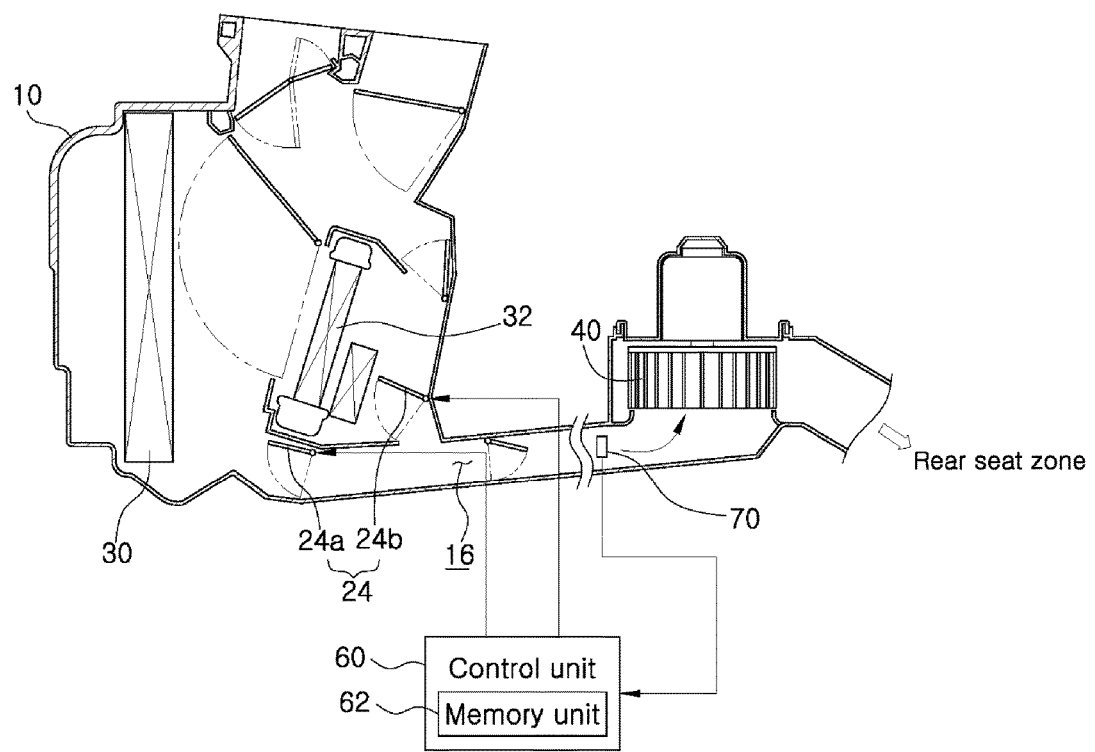
FIG. 6 is a sectional view illustrating an air conditioning system for motor vehicles according to a second embodiment of the present invention.
Figure 7:
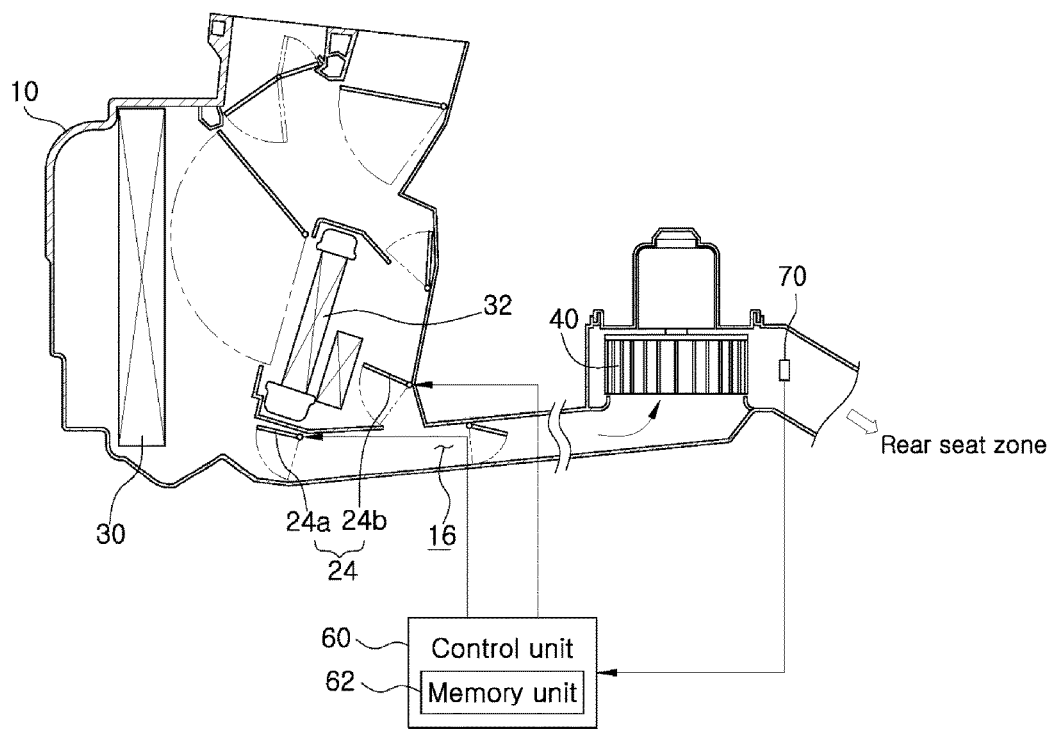
FIG. 7 is a sectional view illustrating a modification of a temperature sensor that constitutes the air conditioning system according to the second embodiment of the present invention.

Unlike the air conditioning system of the first embodiment in which the rear seat temperature door 24 is controlled depending on the rotation speed of the auxiliary blower 40, the air conditioning system of the second embodiment illustrated in FIG. 6 is configured to control the rear seat temperature door 24 depending on the temperature of the air blown toward the auxiliary blower 40.

The air conditioning system of the second embodiment does not include the auxiliary blower rotation speed detection unit 50 (see FIG. 4) but includes a temperature sensor 70 configured to detect the temperature of the air blown toward the auxiliary blower 40.

The temperature sensor 70 is installed in the rear seat path 16 at the upstream side of the auxiliary blower 40. The temperature sensor 70 is configured to detect the temperature of the air at the upstream side of the auxiliary blower 40 and to input detected temperature data to the control unit 60.

If the detected temperature data indicating the temperature of the air at the upstream side of the auxiliary blower 40 is inputted from the temperature sensor 70, the control unit 60 determines whether the detected air temperature is equal to or higher than the first reference temperature, namely 70 degrees C., which is pre-stored in the memory unit 62.

If the detected air temperature is equal to or higher than the first reference temperature, namely 70 degrees C., the control unit 60 determines that the auxiliary blower 40 is likely to be overheated. Based on this determination, the control unit 60 properly controls the rear seat temperature door 24.

Specifically, the control unit 60 controls the rear seat temperature door 24 so as to close the rear seat path 16 at a predetermined opening degree. Thus, the temperature of the air blown toward the auxiliary blower 40 is reduced to a temperature lower than the first reference temperature, namely 70 degrees C.

This makes it possible to reliably prevent a hot air from making contact with the auxiliary blower 40. It is therefore possible to prevent the overheating of the auxiliary blower 40 and, consequently, to prevent thermal deformation and damage of the auxiliary blower 40.

In the example illustrated in FIG. 6, the temperature sensor 70 for detecting the air temperature at the upstream side of the auxiliary blower 40 is installed in the rear seat path 16 at the upstream side of the auxiliary blower 40. Alternatively, as illustrated in FIG. 7, the temperature sensor 70 may be installed in the rear seat path 16 at the downstream side of the auxiliary blower 40.

According to the air conditioning system of the second embodiment configured as above, the temperature of the air existing near the auxiliary blower 40 is directly detected and the amount of the air introduced into the auxiliary blower 40 is controlled depending on the detected air temperature. This makes it possible to rapidly cope with the increase in the temperature of the air introduced into the auxiliary blower 40. It is therefore possible to prevent a hot air from entering the auxiliary blower 40 and, consequently, to prevent the overheating of the auxiliary blower 40 attributable to the introduction of a hot air.

While some preferred embodiments of the present invention have been described above, the present invention is not limited to these embodiments. It is to be understood that various changes and modifications may be made without departing from the scope of the invention defined in the claims.

The invention claimed is:

1. An air conditioning system for motor vehicles, comprising:
   an air conditioner case;
   a main blower disposed in the air conditioner case and configured to draw air from outside the air conditioner case;
   an auxiliary blower disposed in the air conditioner case and configured to draw air from within the air conditioner case, wherein the auxiliary blower is disposed downstream of the main blower with respect to a flow of the air through the air conditioner case;
   a rear seat path through which the air drawn by the main blower flows toward the auxiliary blower through an evaporator or a heater core;
   a rear seat temperature door installed on an upstream side of the auxiliary blower to control an opening amount of the rear seat path;
   a temperature sensor disposed in the rear seat path downstream of the rear seat temperature door; and
   a control unit configured to limit an upper limit value of a temperature of the air drawn into the auxiliary blower for preventing an overheating of the auxiliary blower, wherein the control unit is configured to limit the upper limit value of the temperature of the air drawn into the auxiliary blower by controlling a position of the rear seat temperature door with respect to the rear seat path.

2. The air conditioning system of claim 1, wherein the control unit is configured to differentially control the position of the rear seat temperature door with respect to the rear seat path based on a rotation speed of the auxiliary blower.

3. The air conditioning system of claim 1, wherein the control unit is configured to control the position of the rear seat temperature door with respect to the rear seat path based on a rear seat zone air injection mode.

4. The air conditioning system of claim 1, wherein the control unit is configured to control the position of the rear seat temperature door wherein when the rear seat zone air injection mode is a vent mode or a bi-level mode the temperature of the air introduced into the auxiliary blower is maintained at a temperature lower than a predetermined first reference temperature, and wherein when the rear seat zone air injection mode is a floor mode the temperature of the air introduced into the auxiliary blower is maintained at a temperature lower than a second reference temperature higher than the first reference temperature.

5. The air conditioning system of claim 4, wherein the first reference temperature is 70 degrees C. and the second reference temperature is 75 degrees C.

6. The air conditioning system of claim 1, wherein the control unit is configured to differentially control a rotation speed of the auxiliary blower depending on a rear seat zone air injection mode.

7. The air conditioning system of claim 6, wherein the control unit is configured to control the rotation speed of the auxiliary blower to become higher when the rear seat zone air injection mode is a vent mode or a bi-level mode than when the rear seat zone air injection mode is a floor mode.

8. An air conditioning system for motor vehicles, comprising:
   an air conditioner case;
   a main blower configured to draw air from outside the air conditioner case;
   a rear seat path through which the air drawn by the main blower flows toward a rear seat zone through an evaporator or a heater core;
   an auxiliary blower disposed in the rear seat path and disposed downstream of the main blower with respect to a flow of the air through the air conditioner case, the auxiliary blower configured to draw air from within the air conditioner case and blow the air toward the rear seat zone;
   a temperature sensor disposed on one of an upstream side and a downstream side of the auxiliary blower to detect a temperature of air near the auxiliary blower;
   a rear seat temperature door disposed on the upstream side of the auxiliary blower to control an opening amount of the rear seat path, wherein the temperature sensor is disposed in the rear seat path downstream of the rear seat temperature door; and
   a control unit configured to differentially control an opening position of the rear seat temperature door with respect to the rear seat path depending on the temperature of the air near the auxiliary blower received from the temperature sensor for preventing an overheating of the auxiliary blower, wherein when the temperature of the air near the auxiliary blower is equal to or higher than a predetermined first reference temperature the control unit is configured to control the rear seat temperature door to close the rear seat path at a predetermined opening degree so a temperature of air introduced into the auxiliary blower is maintained at a temperature lower than the first reference temperature.

* * * * *